United States Patent
Wang et al.

(10) Patent No.: US 11,887,230 B1
(45) Date of Patent: Jan. 30, 2024

(54) METHOD, DEVICE, AND COMPUTER PROGRAM PRODUCT FOR GENERATING DATA

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/341,030

(22) Filed: Jun. 26, 2023

(30) Foreign Application Priority Data

Jun. 2, 2023  (CN) .......................... 202310652143.X

(51) Int. Cl.
| | |
|---|---|
| G06T 11/60 | (2006.01) |
| G06F 16/25 | (2019.01) |
| G06V 10/40 | (2022.01) |
| G06F 40/284 | (2020.01) |
| G06F 40/177 | (2020.01) |

(52) U.S. Cl.
CPC ............ *G06T 11/60* (2013.01); *G06F 16/258* (2019.01); *G06F 40/177* (2020.01); *G06F 40/284* (2020.01); *G06V 10/40* (2022.01)

(58) Field of Classification Search
None
See application file for complete search history.

(56) References Cited

U.S. PATENT DOCUMENTS

| | | | |
|---|---|---|---|
| 7,950,034 B2 * | 5/2011 | Sano | .................... G11B 27/034 715/768 |
| 8,955,143 B1 * | 2/2015 | Ramalingam | ....... H04L 63/1416 713/161 |
| 9,659,368 B2 * | 5/2017 | Alsop | ....................... G06T 5/50 |

(Continued)

OTHER PUBLICATIONS

Y. Zhang et al., "GANBLR: A Tabular Data Generation Model," IEEE International Conference on Data Mining (ICDM), Dec. 2021, 10 pages.

(Continued)

*Primary Examiner* — Toan H Vu
(74) *Attorney, Agent, or Firm* — Ryan, Mason & Lewis, LLP

(57) ABSTRACT

Embodiments of the present disclosure relate to a method, a device, and a computer program product for generating data. The method includes obtaining a multi-modality embedding by encoding multi-modality data, the multi-modality data comprising text data and image data. The method further includes obtaining a table embedding by encoding table data associated with the multi-modality data. The method further includes generating a condition embedding based on the multi-modality embedding and the table embedding. The method further includes generating multi-modality table data based on the condition embedding. In this way, it is possible to combine table data generation with multi-modality learning, which improves the characterization capability of the generated data and makes the generated data have sufficient information to describe a real scenario. At the same time, it is possible to reduce the model configuration cost and save computational and storage resources.

20 Claims, 6 Drawing Sheets

(56) References Cited

U.S. PATENT DOCUMENTS

| | | | | |
|---|---|---|---|---|
| 2008/0131085 | A1* | 6/2008 | Ikeda | H04N 19/70 386/335 |
| 2009/0136102 | A1* | 5/2009 | Kimpe | G06T 5/50 382/128 |
| 2019/0163902 | A1* | 5/2019 | Reid | G06F 12/1009 |
| 2021/0201476 | A1* | 7/2021 | Prasad | G06T 7/0012 |
| 2022/0283995 | A1* | 9/2022 | Hakami | G06F 16/24564 |
| 2023/0068103 | A1* | 3/2023 | Zhou | G06F 16/583 |
| 2023/0238143 | A1* | 7/2023 | Edmonds | G16H 10/20 705/2 |

OTHER PUBLICATIONS

L. Xu et al., "Modeling Tabular Data using Conditional GAN," 33rd Conference on Neural Information Processing Systems, Dec. 2019, 11 pages.

V. Borisov et al., "Deep Neural Networks and Tabular Data: A Survey," arXiv:2110.01889v3, Jun. 29, 2022, 22 pages.

S.-C. Li et al., "Evaluating Variational Autoencoder as a Private Data Release Mechanism for Tabular Data," IEEE 24th Pacific Rim International Symposium on Dependable Computing (PRDC), Dec. 2019, pp. 198-206.

P. Anderson et al., "Bottom-Up and Top-Down Attention for Image Captioning and Visual Question Answering," IEEE/CVF Conference on Computer Vision and Pattern Recognition (CVPR), Jun. 2018, pp. 6077-6086.

Z. Zhang et al., "UFC-BERT: Unifying Multi-Modal Controls for Conditional Image Synthesis," 35th Conference on Neural Information Processing Systems, Dec. 2021, 13 pages.

S. Geng et al., "Dynamic Graph Representation Learning for Video Dialog via Multi-Modal Shuffled Transformers," The Thirty-Fifth AAAI Conference on Artificial Intelligence, Feb. 2021, pp. 1415-1423.

J. Lu et al., "Knowing When to Look: Adaptive Attention via a Visual Sentinel for Image Captioning," IEEE Conference on Computer Vision and Pattern Recognition, Jul. 2017, pp. 375-383.

S. Sukhbaatar et al., "End-To-End Memory Networks," Proceedings of the 28th International Conference on Neural Information Processing Systems, vol. 2, Dec. 2015, 9 pages.

J. Devlin et al., "BERT: Pre-training of Deep Bidirectional Transformers for Language Understanding," arXiv:1810.04805v2, May 24, 2019, 16 pages.

K. He et al., "Deep Residual Learning for Image Recognition," IEEE Conference on Computer Vision and Pattern Recognition (CVPR), Jun. 2016, pp. 770-778.

A. Vaswani et al., "Attention Is All You Need," arXiv: 1706.03762v5, 31st Conference on Neural Information Processing Systems, Dec. 6, 2017, 15 pages.

T. Mikolov et al., "Efficient Estimation of Word Representations in Vector Space," arXiv:1301.3781v3, Sep. 7, 2013, 12 pages.

L. Breiman, "Random Forests," Machine Learning, vol. 45, Oct. 2001, pp. 5-32.

C. Cortes et al., "Support-Vector Networks," Machine Learning, vol. 20, Sep. 1995, pp. 273-297.

K. Cho et al., "Learning Phrase Representations using RNN Encoder-Decoder for Statistical Machine Translation," arXiv:1406.1078v3, Sep. 3, 2014, 15 pages.

S. Hochreiter et al., "Long Short-term Memory," Neural Computation, vol. 9, No. 8, Nov. 15, 1997, pp. 1735-1780.

T. N. Kipf et al., "Semi-Supervised Classification with Graph Convolutional Networks," arXiv:1609.02907v4, Feb. 22, 2017, 14 pages.

* cited by examiner

METHOD, DEVICE, AND COMPUTER PROGRAM PRODUCT FOR GENERATING DATA

RELATED APPLICATION

The present application claims priority to Chinese Patent Application No. 202310652143.X, filed Jun. 2, 2023, and entitled "Method, Device, and Computer Program Product for Generating Data," which is incorporated by reference herein in its entirety.

FIELD

Embodiments of the present disclosure relate generally to the field of computers, and more specifically to a method, a device, and a computer program product for generating data.

BACKGROUND

In today's information age, data and artificial intelligence technologies are widely applied in every aspect. With the development of artificial intelligence technologies and the increase in data processing power, it is becoming more and more common to use data to build intelligent products. Data may be acquired through various forms of sharing.

People are beginning to realize the importance of sharing data. By sharing data, information resources can be fully utilized. For example, it enables better understanding of the needs, optimization of products and services, and so on. However, there will be many challenges during the process of sharing data.

SUMMARY

Embodiments of the present disclosure provide a solution for generating data. With a solution for generating data according to embodiments of the present disclosure, it is possible to improve the characterization capability of output data and to reduce the cost of model configuration.

In a first aspect of the present disclosure, a method for generating data is provided. The method includes obtaining a multi-modality embedding by encoding multi-modality data, the multi-modality data comprising text data and image data. The method further includes obtaining a table embedding by encoding table data associated with the multi-modality data. The method further includes generating a condition embedding based on the multi-modality embedding and the table embedding. The method further includes generating multi-modality table data based on the condition embedding.

In another aspect of the present disclosure, a device for generating data is provided. The device includes a processor, and a memory coupled to the processor and having instructions stored thereon, wherein these instructions, when executed by the processor, cause the device to perform actions including obtaining a multi-modality embedding by encoding multi-modality data, the multi-modality data comprising text data and image data. These actions further include obtaining a table embedding by encoding table data associated with the multi-modality data. These actions further include generating a condition embedding based on the multi-modality embedding and the table embedding. These actions further include generating multi-modality table data based on the condition embedding.

In still another aspect of the present disclosure, a computer program product is provided. The computer program product is tangibly stored on a non-transitory computer-readable storage medium and includes computer-executable instructions, wherein the computer-executable instructions, when executed by a computer, cause the computer to perform the method or process according to embodiments of the present disclosure.

It should be noted that this Summary is provided to introduce a series of concepts in a simplified manner, which will be further described in the Detailed Description below. The Summary is neither intended to identify key features or necessary features of the present disclosure, nor intended to limit the scope of the present disclosure.

BRIEF DESCRIPTION OF THE DRAWINGS

By description of embodiments of the present disclosure, provided in more detail herein with reference to the accompanying drawings, the above and other objectives, features, and advantages of the present disclosure will become more apparent, where.

Throughout all the drawings, the same or similar reference numerals generally represent the same or similar elements.

DETAILED DESCRIPTION

Figure 1:
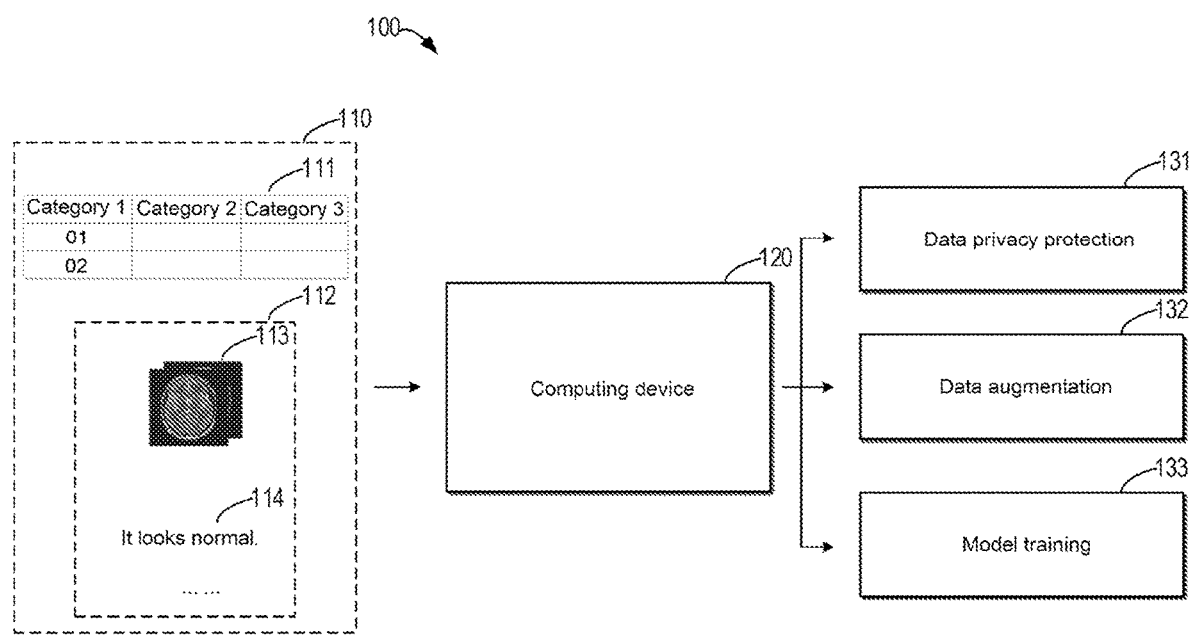
FIG. 1 is a schematic diagram of an example environment in which a method and/or a process according to embodiments of the present disclosure can be implemented.

The following will describe illustrative embodiments of the present disclosure in more detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

As mentioned above, when utilizing data, sharing, synchronizing, or presenting of the data may be involved, so as to enable the full use of information resources. However, there are many challenges during the process of data utilization, one of which is data privacy. The data that is shared may involve sensitive information such as identity information, financial information, and so on. If such information is leaked, it will cause serious damage to individuals and organizations. With the current wave of advances of technologies such as big data and artificial intelligence, the amount of data that needs to be processed has increased dramatically, and such data may include the above sensitive information. To avoid privacy leakage, mechanisms to protect data privacy become critical. Therefore, a balance between data sharing and data privacy is desired and meaningful.

Table data generation is an important task in various fields such as data privacy, data augmentation, and machine learning. Existing table data generation methods focus only on tables with numerical data and category data. Although numerical data and category data are simple in structure and easy to process for generation, they contain a small amount of information or even meaningless information. In other words, such tables have only limited information to describe or characterize real scenarios, which leads to the limitations of the table data generated by these methods in practical application scenarios.

At least to address at least some of the above and other potential problems, embodiments of the present disclosure provide a solution for generating data. The solution includes obtaining a multi-modality embedding by encoding multi-modality data, the multi-modality data comprising text data and image data. The solution further includes obtaining a table embedding by encoding table data associated with the multi-modality data. The solution further includes generating a condition embedding based on the multi-modality embedding and the table embedding. The solution further includes generating multi-modality table data based on the condition embedding. In this way, it is possible to combine table data generation with multi-modality learning, which improves the characterization capability of the generated data and makes the generated data have sufficient information to describe a real scenario. At the same time, it is possible to reduce the model configuration cost and save computational and storage resources.

Basic principles and some example embodiments of the present disclosure are illustrated below with reference to FIG. 1 to FIG. 7. It should be understood that these example embodiments are given only to enable those skilled in the art to better understand and thus implement embodiments of the present disclosure, and are not intended to limit the scope of the present disclosure in any way.

FIG. 1 is a schematic diagram of an example environment 100 in which a method and/or a process according to embodiments of the present disclosure can be implemented. In this example environment 100, table data 111 and multi-modality data 112 can be input as input 110 to a multi-modality table data generation model according to embodiments of the present disclosure that is arranged at a computing device 120. Corresponding processing and calculations (e.g., encoding and decoding processes for multi-modality table data generation described below, etc.) are performed at the computing device 120 by this multi-modality table data generation model, so as to implement multi-modality table data generation according to embodiments of the present disclosure. After the multi-modality table data generation, the generated multi-modality table data can be used for various purposes, such as data privacy protection 131, data augmentation 132, model training 133, and so on.

As shown in FIG. 1, the input 110 includes the table data 111 and the multi-modality data 112. The table data 111 in FIG. 1 illustrates numerical data and category data as an example. In FIG. 1, a row (e.g., a first row) of the table may include categories of data, such as category 1, category 2, category 3, and so on. One or more columns (e.g., a first column) of the table may include numerical values, which may indicate the serial number of a data row or may have a predetermined meaning. In FIG. 1, the categories are shown in rows, and the numerical values are shown in columns. However, this is by no means limiting, and according to embodiments of the present disclosure, the categories may be shown in columns, and the numerical values may be shown in rows.

It should be understood that any row of the table may include categories of data, and that two or more rows are also possible, and the present disclosure is not limited in this regard. It should also be understood that, for ease of illustration, only the first column is shown in FIG. 1 to include numerical values. However, other columns (such as the second column or the third column) or multiple columns (such as any combination of the first column, the second column, and the third column) of the table may also include numerical values, and the present disclosure is not limited in this regard. It should also be noted that for ease of illustration, only three rows and three columns are shown in FIG. 1. However, the table may include more or fewer rows and columns, and the present disclosure is not limited in this regard.

As shown in FIG. 1, the multi-modality data 112 includes image data 113 and text data 114. As described above, the existing table data generation methods are only capable of handling simple numerical and category data, but not more complex high-level data, resulting in limitations in the generated table data. For this reason, the present disclosure introduces the idea of multi-modality learning to help improve the characterization capability and description capability of the output. It should be understood that for ease of understanding, FIG. 1 illustrates that the multi-modality data 112 includes the image data 113 and the text data 114 as an example. However, the multi-modality data 112 may include more or fewer kinds of data, such as audio data and video data, and the present disclosure is not limited in this regard. It should also be noted that the present disclosure does not prescribe and limit the format, size, etc., of the data (e.g., the image data 113, the text data 114, etc.) included in the multi-modality data 112.

The computing device 120 shown in FIG. 1 may be any device with computing power. According to embodiments of the present disclosure, the computing device 120, after receiving the input 110 as described above, performs corresponding processing and calculations via the multi-modality table data generation model thereon, so as to enable multi-modality table data generation according to embodiments of the present disclosure. Examples of the computing device 120 may include a smartphone, a tablet computer, a personal computer, a laptop computer, a server computer, a multiprocessor system, a wearable electronic device, a multimedia player, a personal digital assistant (PDA), a smart home device, a consumer electronic product, and the like. Examples of the computing device 120 may also include a distributed computing environment containing any one of the above devices or systems. In the following, the multi-modality table data generation according to embodiments of the present disclosure will be described in further detail.

After completing the multi-modality table data generation according to embodiments of the present disclosure, the generated multi-modality table data can be used for various purposes. The data privacy protection 131 is one of them. The multi-modality table data generation can be performed under the progressive privacy-preserving data publishing (PPDP) framework. In the field of privacy-preserving data publishing, the PPDP technique has been proposed as a method for generating synthetic data to protect the privacy of original data. The PPDP framework allows the generation of synthetic data to protect the privacy of the original data by progressively publishing more detailed information about the data, thereby providing maximum data availability and usability while fully protecting data privacy.

In addition to the data privacy protection 131, the generated multi-modality table data can also be used for the data augmentation 132. The data augmentation 132 refers to techniques for generating more data by performing a series of transformations or expansions on the original data. The multi-modality table data generation according to embodiments of the present disclosure enables effective expansion of the scale and diversity of the data set.

The generated multi-modality table data can also be used for the model training 133. With the multi-modality table data generation according to embodiments of the present disclosure, the scale and diversity of the generated multi-modal table data are enhanced compared with those of the original data. By using the generated multi-modality table data as a training set for training, for example, a machine learning model, the generalization capability and robustness of the model can be improved, and the risk of over-fitting can be reduced, thus improving the performance of the model. It should be understood that none of the uses as described above are intended to be limiting, but are shown as an example for the purpose of facilitating understanding. The generated multi-modality table data can also be used for additional purposes, and the present disclosure is not limited in this regard.

The schematic diagram of the example environment 100 in which the method and/or process according to embodiments of the present disclosure can be implemented is described above in conjunction with FIG. 1. A flow chart of a method 200 for generating data according to embodiments of the present disclosure will be described below with reference to FIG. 2. As described above for the computing device 120, the method 200 for generating data according to embodiments of the present disclosure may be performed at an edge device with a computing capability, or performed at a cloud server, which is not limited in the present disclosure.

Figure 2:
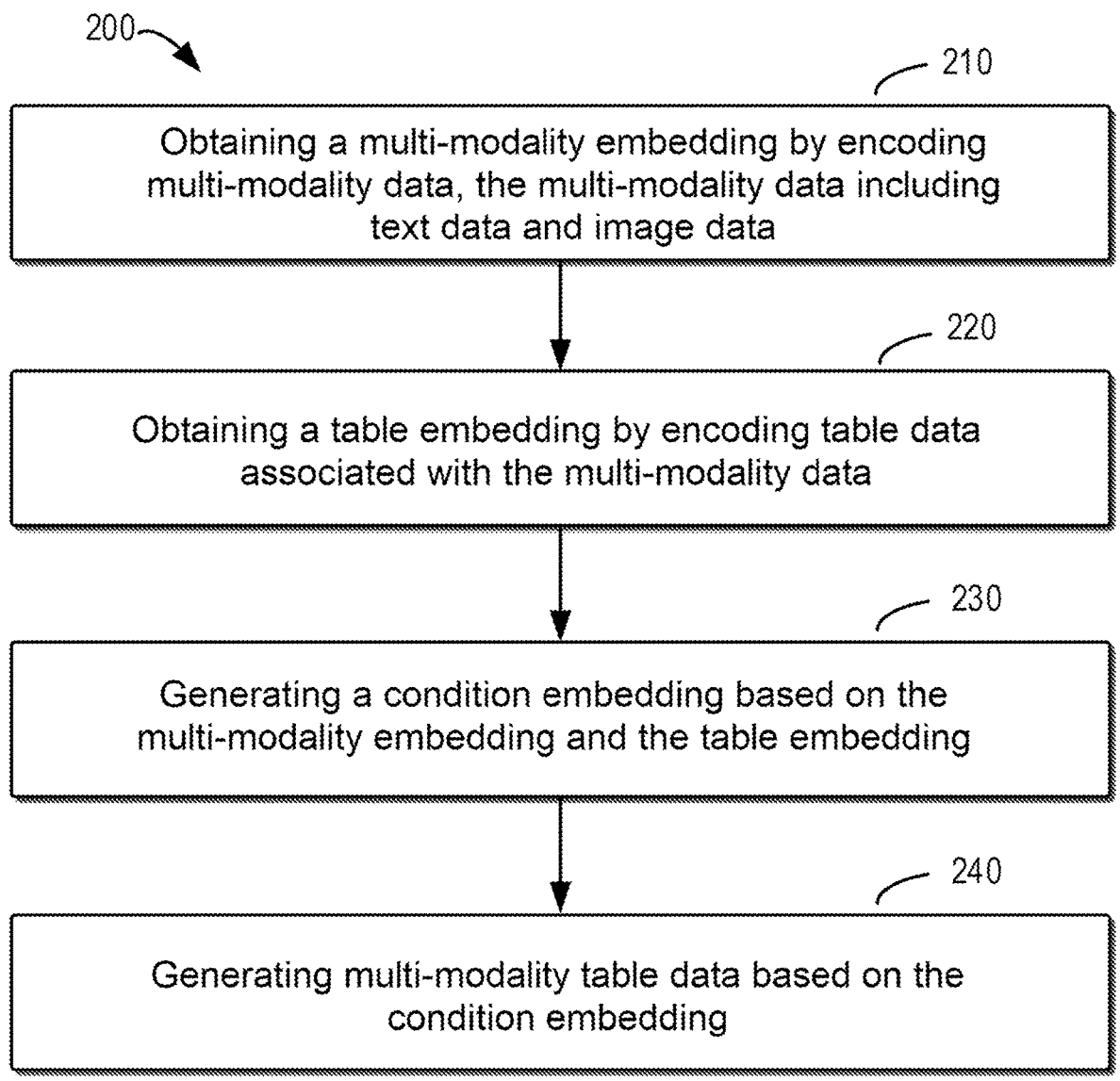
FIG. 2 is a flow chart of a method for generating data according to embodiments of the present disclosure.

FIG. 2 is a flow chart of the method 200 for generating data according to embodiments of the present disclosure. In order to improve the characterization capability of the generated data and to reduce the cost of model configuration, the method 200 for generating data according to embodiments of the present disclosure is provided.

At block 210, a multi-modality embedding is obtained by encoding multi-modality data, the multi-modality data comprising text data and image data. The multi-modality table data generation model according to embodiments of the present disclosure can handle the multi-modality data 112 with high complexity and can transform the multi-modality data 112 into a corresponding vector representation. In the following, this multi-modality transformation process will be described in further detail.

At block 220, a table embedding is obtained by encoding table data associated with the multi-modality data. As described above, the table data 111 may include numerical data and category data. For example, since the data in the multi-modality data 112 may be identified by the numerical data in the table data 111 or may belong to a category indicated by the category data in the table data 111, the multi-modality data 112 is associated with the table data 111. The multi-modality table data generation model according to embodiments of the present disclosure can handle the relatively simple table data 111 and can transform the table data 111 into a corresponding vector representation. In the following, the transformation process for the table data 111 will be described in further detail.

At block 230, a condition embedding is generated based on the multi-modality embedding and the table embedding. According to embodiments of the present disclosure, a condition embedding may be generated based on the multi-modality embedding generated at block 210 and the table embedding generated at block 220, wherein the condition embedding may serve as a constraint on the data generation process to control the pattern of the output. In the following, the generation process for the condition embedding will be described in further detail.

At block 240, multi-modality table data is generated based on the condition embedding. According to embodiments of the present disclosure, the introduction of the multi-modality learning enables the model to handle not only conventional simple data, but also more complex data. In this way, the generated multi-modality table data can be closer to a real scenario and improve the characterization capability of the output. At the same time, the table data 111 and the multi-modality data 112 are encoded separately, making it possible to utilize models of different capacities for different levels of data, thus saving computational and storage resources. In the following, an example implementation of multi-modality table data generation according to embodiments of the present disclosure will be given.

Figure 3:
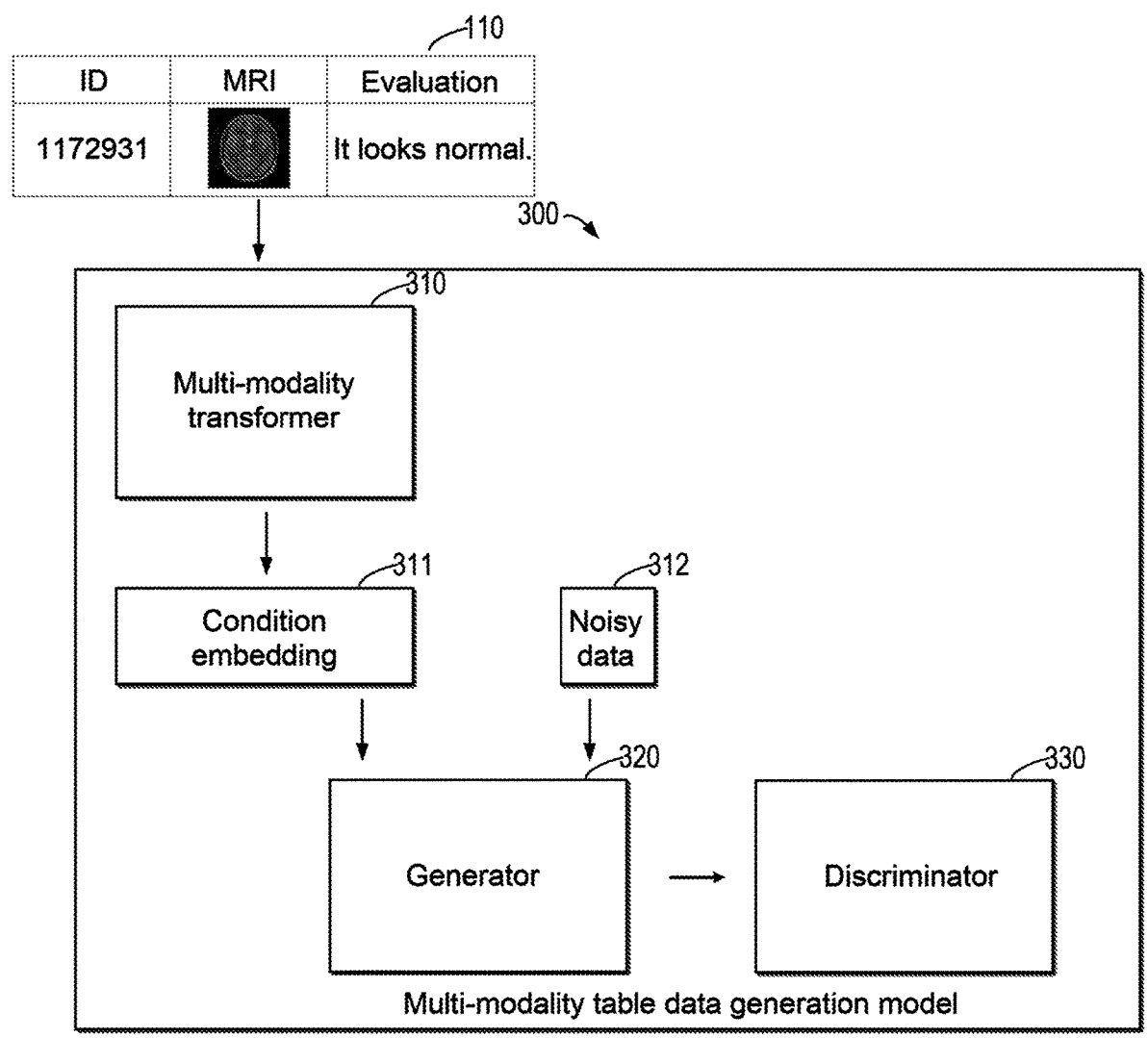
FIG. 3 is a schematic diagram illustrating the architecture of a multi-modality table data generation model according to embodiments of the present disclosure.

FIG. 3 is a schematic diagram illustrating an architecture of a multi-modality table data generation model 300 according to embodiments of the present disclosure. As illustrated in FIG. 3, the multi-modality table data generation model 300 includes a multi-modality transformer 310, a generator 320, and a discriminator 330. In addition, FIG. 3 also schematically illustrates the input 110 including the table data 111 and the multi-modality data 112. It should be noted that the components included in the multi-modality table data generation model 300 are examples and not limiting. The multi-modality table data generation model 300 may include more or fewer components, and the present disclosure is not limited in this regard.

According to embodiments of the present disclosure, the input 110 is input to the multi-modality transformer 310 in the multi-modality table data generation model 300 for use in transformation. As illustrated exemplarily in FIG. 3, the input 110 includes the table data 111, wherein the table data 111 includes both category data and numerical data. By way of example, the category data includes "ID," "Nuclear magnetic resonance imaging (MRI)," and "Evaluation," and the numerical data "1172931" belongs to the "ID" category and is used to identify this data item (this row of the table). The input 110 also includes the multi-modality data 112, wherein this multi-modality data 112 includes the image data 113 and the text data 114. By way of example, the image data 113 includes an MRI image of the brain, and the text data includes an evaluation. The data in different columns of the table may be correlated. For example, the ID "1172931" identifies the corresponding MRI image and evaluation, or the evaluation corresponding to an MRI image that presents a normal brain is "It looks normal." It should be understood that for ease of illustration, only one data item (one row of the table) is shown herein, but the table may include more data items.

According to embodiments of the present disclosure, the multi-modality transformer 310 included in the multi-modality table data generation model 300 processes the table data 111 and the multi-modality data 112 in the input 110 separately to generate the condition embedding 311. The generated condition embedding 311 constitutes a constraint on the generation process performed by the generator 320, so as to control the pattern of the output. In the following, the transformation process performed by the multi-modality transformer 310 will be described in further detail.

According to embodiments of the present disclosure, the generator 320 included in the multi-modality table data generation model 300 can generate multi-modality table data based on the condition embedding 311 generated by the multi-modality transformer 310. The generated multi-modality table data may be presented in a table form, for example, in a pattern that is the same as or similar to that of the input 110 in FIG. 3. Alternatively or additionally, generating of the multi-modality table data may be based on noisy data 312. The noisy data 312 may include a series of noisy data conforming to a Gaussian distribution, i.e., Z~N (0, 1), where Z refers to this series of noisy data. In the following, the generation process performed by the generator 320 will be described in further detail.

According to embodiments of the present disclosure, a discriminator 330 included in the multi-modality table data generation model 300 may discriminate the generated multi-modality table data so as to distinguish between positive samples and negative samples. The generated multi-modality table data may include a plurality of columns and a plurality of rows, and in the case where the columns of the table correspond to categories and the rows correspond to data items, the discriminator 330 can perform discrimination for each of the plurality of rows. In other words, each row is considered as one data item, and the discriminator 330 may perform discrimination based on the correlation of the data in each of the generated data items. By contrast, this is also possible in the case where the rows of the table correspond to categories and the columns correspond to data items. In this case, the discriminator 330 can perform discrimination for each of a plurality of columns.

In one example, if one of the generated data items includes an MRI image that presents a normal brain and includes the evaluation "It looks normal," then the data item may be identified as a positive sample. Conversely, if one of the generated data items includes an MRI image that presents a normal brain but includes the evaluation "It looks abnormal," then the data item may be identified as a negative sample. The sample quality of the generated multi-modality table data may be determined based on the discrimination results from the discriminator 330. For example, the sample quality of the generated multi-modality table data may be determined based on the ratio between positive and negative samples in the generated multi-modality table data. The multi-modality transformation process according to embodiments of the present disclosure is described below in conjunction with FIG. 4.

Figure 4:
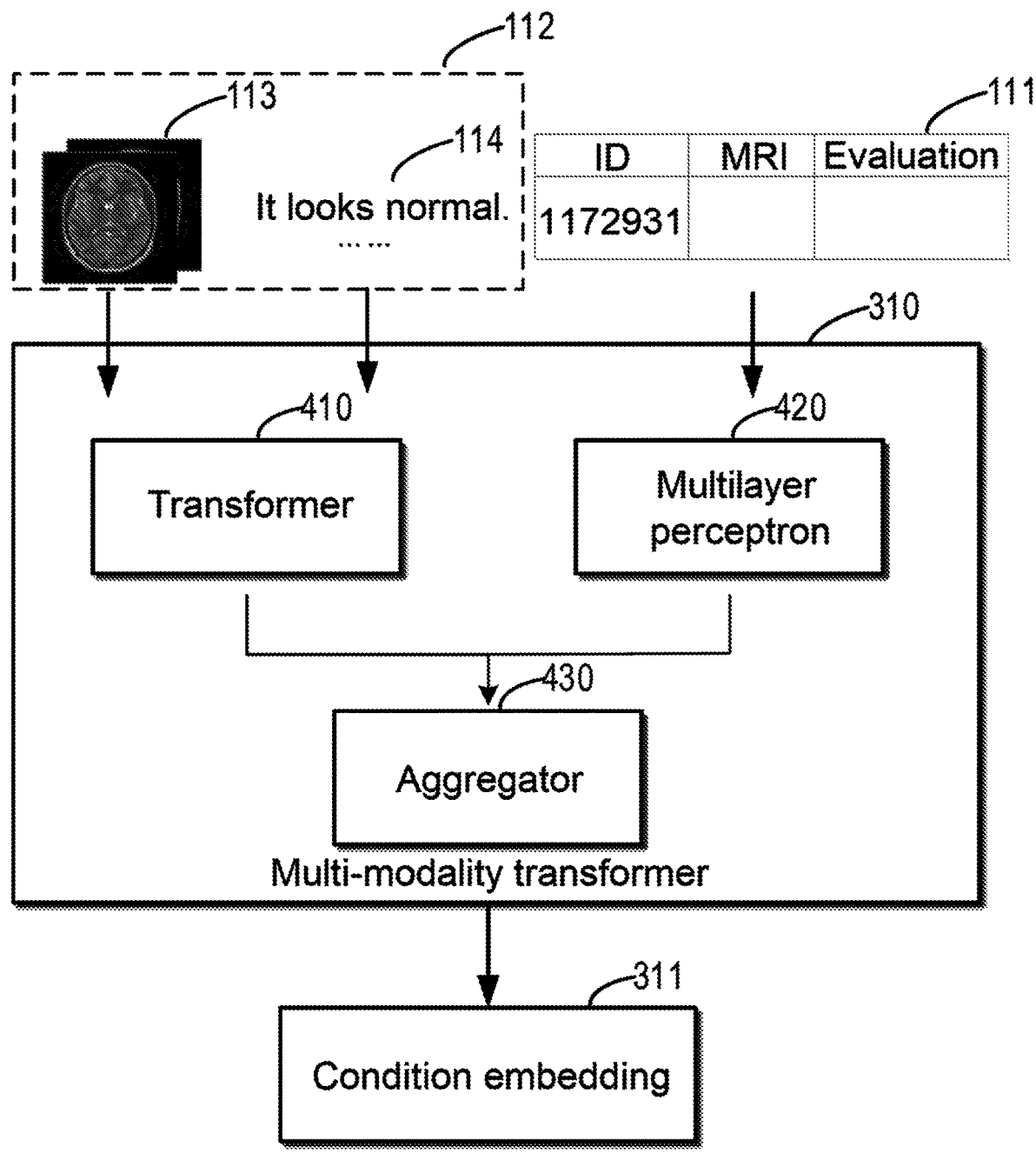
FIG. 4 is a schematic diagram illustrating a multi-modality transformation process according to embodiments of the present disclosure.

FIG. 4 is a schematic diagram illustrating a multi-modality transformation process according to embodiments of the present disclosure. As shown in FIG. 4, the multi-modality transformer 310 includes a transformer 410, a multilayer perceptron 420, and an aggregator 430. The multi-modality data 112 and the table data 111 may be input to the transformer 410 and the multilayer perceptron 420 included in the multi-modality transformer 310, respectively.

According to embodiments of the present disclosure, a transformer-based model implemented by transformer 410 is a model with a large model capacity and high processing power to handle complex data, and the transformer-based model may include a bidirectional encoder representation from transformers (BERT) model to process the text data 114. The BERT model is a transformer-based language model trained on a large corpus of text data, which can encode the input text. The input text may be represented as a text token sequence, which is then encoded as the text embedding $h_{text}$. The BERT model is adjusted with respect to task-specific data to learn task-specific representations of text. The text encoder can be represented by the following Equation (1):

$$h_{text}=\text{BERT}(x_{text};\theta_{BERT}) \qquad (1)$$

where $x_{text}$ denotes the input text, BERT denotes the above transformer-based text encoder, and $\theta_{BERT}$ denotes the adjusted parameters of the BERT model.

According to embodiments of the present disclosure, the transformer-based model implemented by transformer 410 may include a convolutional neural network (CNN), such as a residual neural network (ResNet), to process the image data 113. Image features of the input image may be extracted, and the extracted image features are encoded as the image embedding $h_{image}$. The CNN is adjusted with respect to the task-specific data to learn task-specific representations of the image. The image encoder can be represented by the following Equation (2):

$$h_{image}=\text{ResNet}(x_{image};\theta_{ResNet}) \qquad (2)$$

where $x_{image}$ denotes the input image, ResNet denotes the CNN-based image encoder, and $\theta_{ResNet}$ denotes the adjusted parameters of the ResNet model. The above text embedding and image embedding $h_{image}$ may have predetermined lengths.

According to embodiments of the present disclosure, after obtaining the text embedding $h_{text}$ and the image embedding $h_{image}$, they can be concatenated to form the multi-modality embedding $h_{multi}$. It should be noted that the present disclosure does not limit the concatenation mechanism. The multi-modality embedding $h_{multi}$ can be represented by the following Equation (3):

$$h_{multi}=\text{Concatenate}(h_{text},h_{image}) \qquad (3)$$

where Concatenate denotes any mechanism, such as stitching, that can accomplish the concatenation of the text embedding $h_{text}$ with the image embedding $h_{image}$.

In some embodiments, the multi-modality embedding $h_{multi}$ can be made to focus on portions of interest in the text data 114 and the image data 113, such as the most important or effective portions, by an attention mechanism (e.g., a multi-headed self-attention mechanism). The focusing process may be represented by the following Equation (4):

$$h_{multi}=\text{MultiHeadSelfAttention}(h_{multi};\theta_{attention}) \qquad (4)$$

where MultiHeadSelfAttention denotes the multi-headed self-attention mechanism, and $\theta_{attention}$ denotes the parameters of the mechanism.

According to embodiments of the present disclosure, a multilayer perceptron (MLP)-based model implemented by multilayer perceptron 420 is a relatively small model. The MLP-based model can use one-hot encoding or normalization to transform numerical values into embeddings. These embeddings are then passed through a fully connected layer to generate the final embedding. The transformation process for the numerical embeddings can be represented by the following Equation (5):

$$h_{num}=MLP(\text{Embedding}(x_{num});\theta_{MLP}) \quad (5)$$

where $x_{num}$ denotes the input numerical value, Embedding denotes the embedding function, MLP denotes the fully connected layer, and $\theta_{MLP}$ denotes the parameters of the MLP.

According to embodiments of the present disclosure, the MLP-based model can transform the input categories into embeddings using an embedding layer. These embeddings are then passed through a fully connected layer to generate the final embedding. The transformation process for the category embeddings can be represented by the following Equation (6):

$$h_{cat}=MLP(\text{Embedding}(x_{cat});\theta_{MLP}) \quad (6)$$

where $x_{cat}$ denotes the input category, Embedding denotes the embedding function, MLP denotes the fully connected layer, and $\theta_{MLP}$ denotes the parameters of the MLP.

To effectively combine the embeddings from the transformer-based model of transformer 410 and the MLP-based model of multilayer perceptron 420, the aggregator 430, according to embodiments of the present disclosure, can aggregate the multi-modality embedding with the table embedding including the numerical embedding and the category embedding so as to form the condition embedding 311. The aggregator may include simple MLPs, complex neural networks (such as transformers, etc.), and conventional machine learning algorithms (such as random forests, support vector machines, etc.). The aggregation process can be represented by the following Equation (7):

$$h_{final}=\text{Aggregator}(h_{multi},h_{num},h_{cat};\theta_{agg}) \quad (7)$$

where $h_{final}$ denotes the condition embedding, Aggregator denotes the aggregation function, $h_{num}$ denotes the numerical embedding, $h_{cat}$ denotes the category embedding, and $\theta_{agg}$ denotes the parameters of the aggregator.

According to embodiments of the present disclosure, the aggregator 430 can perform the aggregation process based on any one or a combination of 1) an attention-based aggregation mechanism, 2) a gated aggregation mechanism, or 3) a graph-based aggregation mechanism. The attention-based aggregation mechanism is capable of weighing the importance of different parts of the multi-modality embedding, the numerical embedding, and the category embedding when generating the condition embedding 311. The gated aggregation mechanism is capable of controlling the flow of information between the different parts of the multi-modality embedding, the numerical embedding, and the category embedding. The graph-based aggregation mechanism is capable of modeling the relationships between different parts of the multi-modality embedding, the numerical embedding, and the category embedding. Any combination of these aggregation mechanisms can also be used to perform the aggregation process, which is also referred to as a hierarchical aggregation mechanism. The hierarchical aggregation mechanism is capable of combining the multi-modality embedding, the numerical embedding, and the categorical embedding, and it includes multiple levels of aggregation, each of which is dedicated to a different aspect of the data.

Figures 5, 6:
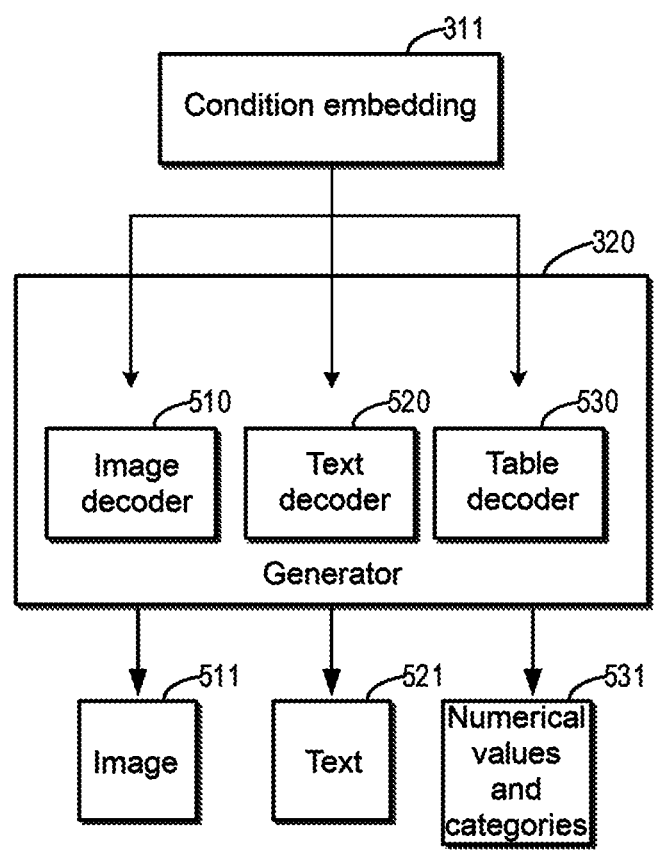
FIG. 5 is a schematic diagram illustrating a process for generating multi-modality table data according to embodiments of the present disclosure.
FIG. 6 shows an example of the generated multi-modality table data according to embodiments of the present disclosure.

FIG. 5 is a schematic diagram illustrating a process for generating multi-modality table data according to embodiments of the present disclosure. As shown in FIG. 5, the generator 320 includes an image decoder 510, a text decoder 520, and a table decoder 530. The image decoder 510, the text decoder 520, and the table decoder 530 can each generate images 511, text 521, and numerical values and categories 531 based on the condition embedding 311 to ultimately generate the multi-modality table data without splitting the condition embedding 311.

The generator 320 needs to be trained before the desired multi-modality table data is generated. According to embodiments of the present disclosure, the set of parameters of the generator 320 can be adjusted by minimizing a loss function that is based on the differences between the multi-modality table data versus the multi-modality data and table data used to generate that multi-modality table data, that is, adjusting the set of parameters of the image decoder 510, the text decoder 520, and the table decoder 530 included in the generator 320. When the loss satisfies a certain condition, such as being below a predetermined threshold, it can be determined that the generator 320 has been adequately trained, that is, the image decoder 510, the text decoder 520, and the table decoder 530 included in the generator 320 have been adequately trained.

According to embodiments of the present disclosure, the multi-modality table data includes a plurality of columns. The columns may correspond to categories. The components included in the generator 320 may correspond to categories. Where the categories include an image category, a text category, and a numerical category, the image decoder 510, the text decoder 520, and the table decoder 530 included in the generator 320 may correspond to the image category, the text category, and the numerical category, respectively. It should be understood that this is only an example and that other correspondences exist.

According to embodiments of the present disclosure, the image decoder 510 may include a generative adversarial network (GAN) or a variational autoencoder (VAE) to generate images from the condition embedding $h_{final}$, and this process may be represented by the following Equation (8):

$$I_{gen}=\text{ImageDecoder}(h_{final};\theta_{img}) \quad (8)$$

where $I_{gen}$ denotes the generated image, ImageDecoder denotes the image decoding function, and $\theta_{img}$ denotes the parameters of the image decoder.

According to embodiments of the present disclosure, the text decoder 520 may include a GPT-2 or a BERT to generate text from the condition embedding $h_{final}$, and this process may be represented by the following Equation (9):

$$T_{gen}=\text{TextDecoder}(h_{final};\theta_{txt}) \quad (9)$$

where $T_{gen}$ denotes the generated text, TextDecoder denotes the text decoding function, and $\theta_{txt}$ denotes the parameters of the text decoder.

According to embodiments of the present disclosure, the table decoder 530 may include an MLP to generate numerical values and categories from the condition embedding $h_{final}$, and this process may be represented by the following Equation (10):

$$X_{gen}=\text{TableDecoder}(h_{final};\theta_{tab}) \quad (10)$$

where $X_{gen}$ denotes the generated numerical values and categories, TableDecoder denotes the table decoding function, and $\theta_{tab}$ denotes the parameters of the table decoder.

FIG. 6 shows an example 600 of the generated multi-modality table data according to embodiments of the present disclosure. The generated multi-modality table data is presented in the table shown in FIG. 6. This table includes three categories, namely, "Serial number," "Traffic sign," and "Evaluation," where "Traffic Sign" and "Evaluation" correspond to image data and text data, respectively. For illustrative purposes, FIG. 6 illustrates two data items, i.e., the row with the serial number of 1 and the row with the serial number of 2.

In the example 600 of FIG. 6, the traffic sign in the row with the serial number of 1 indicates that passing is prohibited, and the evaluation is "No passing." Therefore, this data item 1 can be considered as a positive sample. The traffic sign in the row with the serial number of 2 indicates that passing is prohibited, and the evaluation is "Passing allowed." Therefore, this data item 2 can be considered as a negative sample. It should be understood that the number of the generated multi-modality table data may be greater than the number of input data used to generate the multi-modality table data, or equal to or less than the number of input data used to generate the multi-modality table data, and the present disclosure is not limited in this regard.

With embodiments of the present disclosure, the generated multi-modality table data, although different from the input data, can reflect the features of the input data, such as the pattern, the distribution, the correlation, and so on. The data privacy of the original data can be effectively protected by sharing the generated multi-modality table data. In addition, the generated multi-modality table data can also be used for other purposes, such as data augmentation, model training, and the like. With embodiments of the present disclosure, it is possible to combine table data generation with multi-modality learning, which improves the characterization capability of the generated data and makes the generated data have sufficient information to describe a real scenario. At the same time, it is possible to reduce the model configuration cost and save computational and storage resources.

Figure 7:
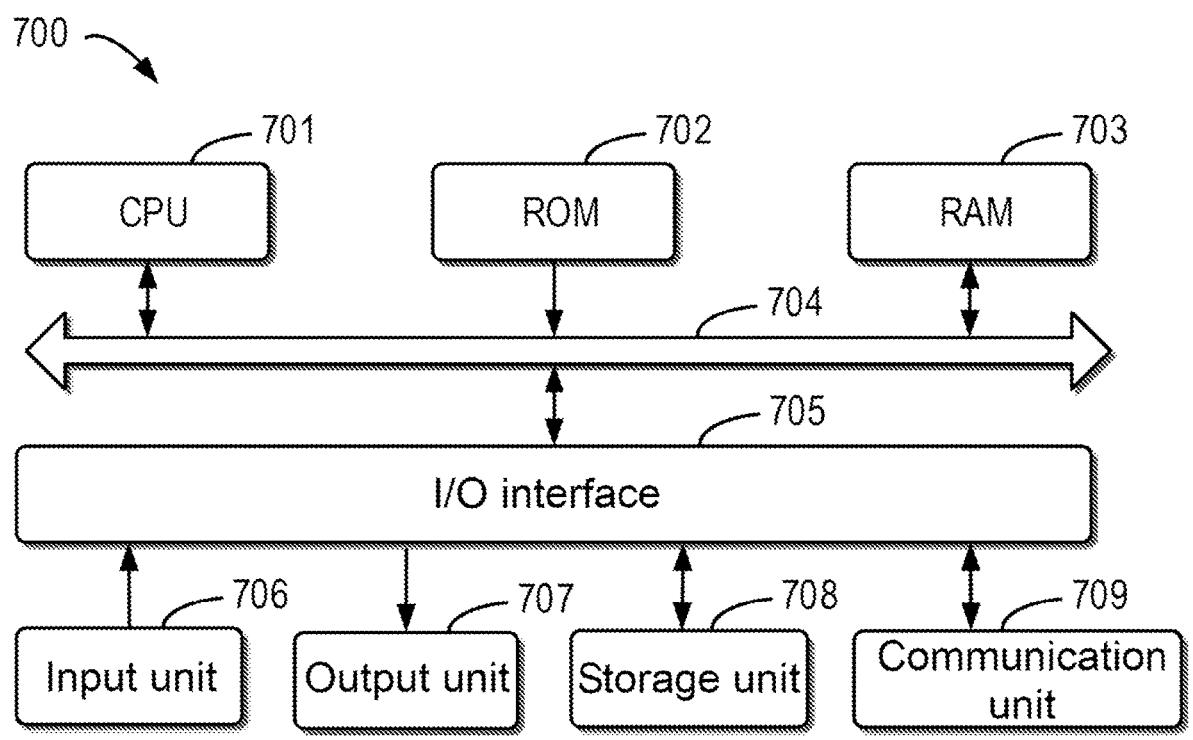
FIG. 7 is a block diagram of an example device that can be used to implement embodiments according to the present disclosure.

FIG. 7 is a schematic block diagram of an example device 700 that may be used for implementing some embodiments according to the present disclosure. As shown FIG. 7, the device 700 includes a central processing unit (CPU) 701, which may execute various appropriate actions and processing in accordance with computer program instructions stored in a read-only memory (ROM) 702 or computer program instructions loaded from a storage unit 708 into a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network such as the Internet and/or various telecommunication networks.

The various processes and processing described above, such as the method 200, may be performed by the CPU 701. For example, in some embodiments, the method 200 may be implemented as a computer software program that is tangibly included in a machine-readable medium such as the storage unit 708. In some embodiments, part or all of the computer programs may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for generating data, comprising:
    obtaining a multi-modality embedding by encoding multi-modality data, the multi-modality data comprising text data and image data;
    obtaining a table embedding by encoding table data associated with the multi-modality data;
    generating a condition embedding based on the multi-modality embedding and the table embedding; and
    generating multi-modality table data based on the condition embedding.

2. The method according to claim 1, wherein obtaining the multi-modality embedding comprises:
    representing the text data as a text token sequence for the text data;
    transforming the text token sequence into a text embedding by encoding the text token sequence;
    extracting image features for the image data from the image data; and
    transforming the image features into an image embedding by encoding the image features.

3. The method according to claim 2, wherein:
    the transformation from the text token sequence into the text embedding and the transformation from the image features into the image embedding are performed by a transformer-based model; and
    the text embedding and the image embedding have pre-determined lengths.

4. The method according to claim 2, wherein obtaining the multi-modality embedding further comprises:
    obtaining the multi-modality embedding by concatenating the text embedding and the image embedding; and
    obtaining, by focusing the multi-modality embedding on portions of interest in the text data and the image data, the focused multi-modality embedding.

5. The method according to claim 1, wherein the table data comprises numerical data and category data, and wherein obtaining the table embedding comprises:
    transforming the numerical data into a numerical embedding; and
    transforming the category data into a category embedding,
    wherein the transformation from the numerical data into the numerical embedding and the transformation from the category data into the category embedding are performed by a multilayer perceptron based model.

6. The method according to claim 1, wherein generating the condition embedding comprises aggregating the multi-modality embedding and the table embedding into the condition embedding, the aggregating being performed by any one of or any combination of:
an attention-based aggregation mechanism;
a gated aggregation mechanism; or
a graph-based aggregation mechanism.

7. The method according to claim 1, wherein the multi-modality table data comprises a plurality of columns and a plurality of rows, the method further comprising:
identifying, for each of the plurality of rows, positive samples and negative samples in the multi-modality table data based on correlation between the plurality of columns; and
indicating a sample quality of the multi-modality table data based on a ratio between the positive samples and the negative samples.

8. The method according to claim 7, wherein:
generating of the multi-modality table data is based on noisy data, the noisy data comprising a series of noisy data conforming to a Gaussian distribution, and
wherein the multi-modality table data is generated by a generator, the method further comprising:
adjusting a set of parameters of the generator by minimizing a loss function that is based on differences between the multi-modality table data versus the multi-modality data and the table data.

9. The method according to claim 8, wherein:
the generator comprises an image decoder, a text decoder, and a table decoder, and
the image decoder, the text decoder, and the table decoder each correspond to one of the plurality of columns.

10. The method according to claim 9, further comprising:
generating an image by the image decoder based on the condition embedding;
generating text by the text decoder based on the condition embedding; and
generating numerical values and categories by the table decoder based on the condition embedding.

11. A device for generating data, comprising:
a processor; and
a memory coupled to the processor and storing instructions, wherein the instructions, when executed by the processor, cause the device to perform actions comprising:
obtaining a multi-modality embedding by encoding multi-modality data, the multi-modality data comprising text data and image data;
obtaining a table embedding by encoding table data associated with the multi-modality data;
generating a condition embedding based on the multi-modality embedding and the table embedding; and
generating multi-modality table data based on the condition embedding.

12. The device according to claim 11, wherein obtaining the multi-modality embedding comprises:
representing the text data as a text token sequence for the text data;
transforming the text token sequence into a text embedding by encoding the text token sequence;
extracting image features for the image data from the image data; and
transforming the image features into an image embedding by encoding the image features.

13. The device according to claim 12, wherein:
the transformation from the text token sequence into the text embedding and the transformation from the image features into the image embedding are performed by a transformer-based model; and
the text embedding and the image embedding have predetermined lengths.

14. The device according to claim 12, wherein obtaining the multi-modality embedding further comprises:
obtaining the multi-modality embedding by concatenating the text embedding and the image embedding; and
obtaining, by focusing the multi-modality embedding on portions of interest in the text data and the image data, the focused multi-modality embedding.

15. The device according to claim 11, wherein the table data comprises numerical data and category data, and wherein obtaining the table embedding comprises:
transforming the numerical data into a numerical embedding; and
transforming the category data into a category embedding,
wherein the transformations from the numerical data into the numerical embedding and from the category data into the category embedding are performed by a multilayer perceptron based model.

16. The device according to claim 11, wherein generating the condition embedding comprises aggregating the multi-modality embedding and the table embedding into the condition embedding, the aggregating being performed by any one of or any combination of:
an attention-based aggregation mechanism;
a gated aggregation mechanism; or
a graph-based aggregation mechanism.

17. The device according to claim 11, wherein the multi-modality table data comprises a plurality of columns and a plurality of rows, the actions further comprising:
identifying, for each of the plurality of rows, positive samples and negative samples in the multi-modality table data based on correlation between the plurality of columns; and
indicating a sample quality of the multi-modality table data based on a ratio between the positive samples and the negative samples.

18. The device according to claim 17, wherein:
generating of the multi-modality table data is based on noisy data, the noisy data comprising a series of noisy data conforming to a Gaussian distribution, and
wherein the multi-modality table data is generated by a generator, the actions further comprising:
adjusting a set of parameters of the generator by minimizing a loss function that is based on differences between the multi-modality table data versus the multi-modality data and the table data.

19. The device according to claim 18, wherein the generator comprises an image decoder, a text decoder, and a table decoder, and the image decoder, the text decoder, and the table decoder each correspond to one of the plurality of columns, the actions further comprising:
generating an image by the image decoder based on the condition embedding;
generating text by the text decoder based on the condition embedding; and
generating numerical values and categories by the table decoder based on the condition embedding.

20. A computer program product tangibly stored on a non-transitory computer-readable storage medium and comprising computer-executable instructions, wherein the computer-executable instructions, when executed by a computer, cause the computer to perform a method for generating data, the method comprising:

obtaining a multi-modality embedding by encoding multi-modality data, the multi-modality data comprising text data and image data;

obtaining a table embedding by encoding table data associated with the multi-modality data;

generating a condition embedding based on the multi-modality embedding and the table embedding; and generating multi-modality table data based on the condition embedding.

\* \* \* \* \*